United States Patent
Staats

(10) Patent No.: US 6,691,096 B1
(45) Date of Patent: Feb. 10, 2004

(54) GENERAL PURPOSE DATA CONTAINER METHOD AND APPARATUS FOR IMPLEMENTING AV/C DESCRIPTORS

(75) Inventor: Erik P. Staats, Ben Lomond, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/429,233

(22) Filed: Oct. 28, 1999

(51) Int. Cl.[7] ............................................. G06F 17/30
(52) U.S. Cl. ........................... 707/1; 707/100; 707/101
(58) Field of Search ................................ 707/100, 101, 707/102, 103, 104; 700/83; 710/5, 8, 105; 709/224; 725/20, 80; 348/473

(56) References Cited

U.S. PATENT DOCUMENTS

| | | | | |
|---|---|---|---|---|
| 5,684,715 A | * | 11/1997 | Palmer | 348/473 |
| 6,032,202 A | * | 2/2000 | Lea et al. | 710/8 |
| 6,131,129 A | * | 10/2000 | Ludtke et al. | 710/5 |
| 6,133,938 A | * | 10/2000 | James | 725/80 |
| 6,141,702 A | * | 10/2000 | Ludtke et al. | 710/5 |
| 6,192,189 B1 | * | 2/2001 | Fujinami et al. | 386/96 |
| 6,202,210 B1 | * | 3/2001 | Ludtke | 725/20 |
| 6,260,063 B1 | * | 7/2001 | Ludtke et al. | 709/224 |
| 6,282,597 B1 | * | 8/2001 | Kawamura | 710/105 |
| 6,295,479 B1 | * | 9/2001 | Shima et al. | 700/83 |

* cited by examiner

Primary Examiner—Sanjiv Shah
(74) Attorney, Agent, or Firm—Sierra Patent Group, Ltd.

(57) ABSTRACT

Disclosed herein is a data management system for AV/C descriptor data. The system includes a data container hierarchical structure. The system also includes a methodology for compiling data from the containers into a read buffer upon receipt of a request from a requester. The data presented to the requestor will preferably be in a format that may be understood by other device requesters that may or may not be utilizing this same container system.

14 Claims, 8 Drawing Sheets

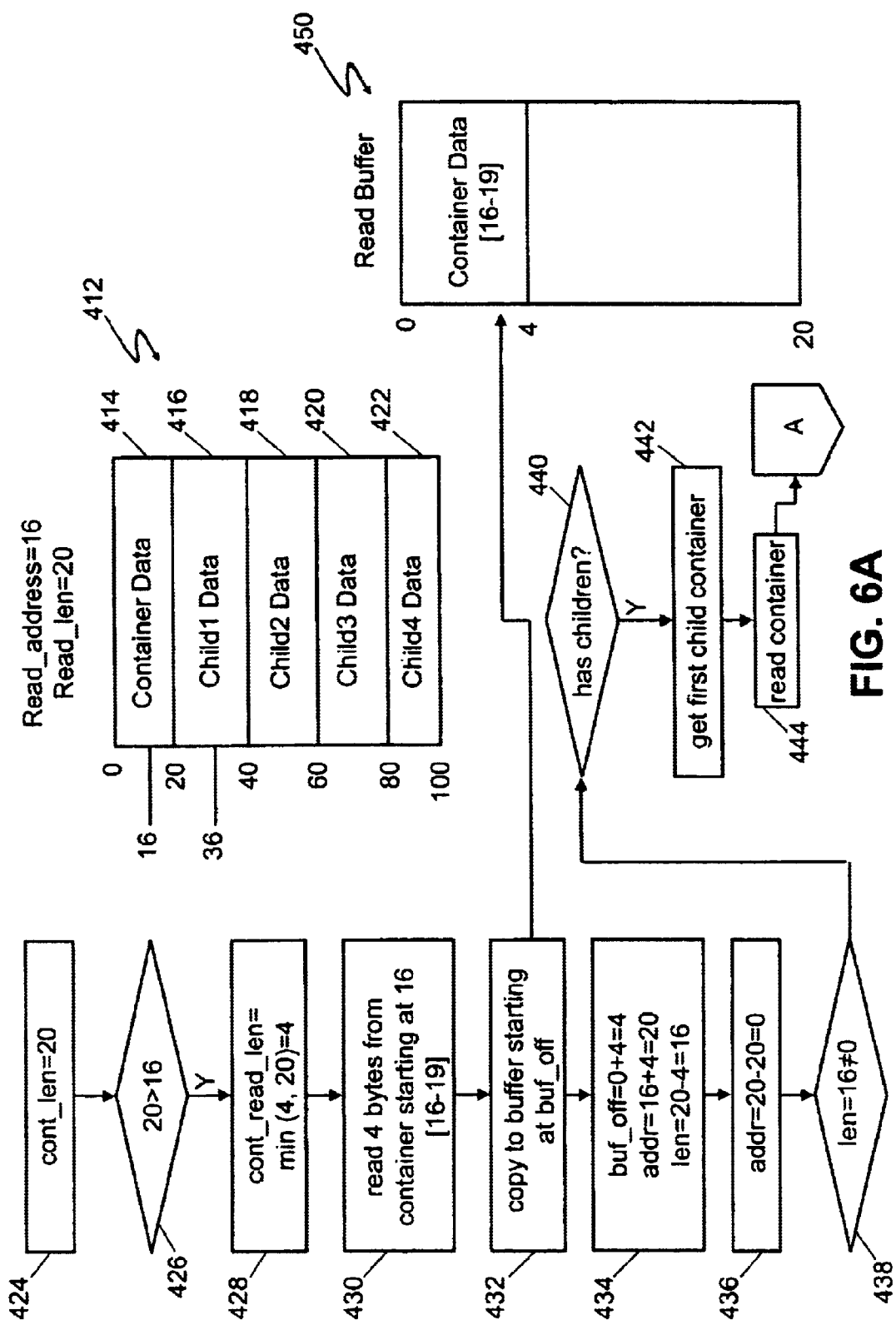

GENERAL PURPOSE DATA CONTAINER METHOD AND APPARATUS FOR IMPLEMENTING AV/C DESCRIPTORS

BACKGROUND OF THE INVENTION

1. Field of the Invention

This invention relates to audio/video control (AV/C) implementations. More particularly, this invention relates to providing a methodology for accessing and interacting with AV/C descriptors within the standards of the AV/C Digital Interface Command Set General Specification.

2. The Prior Art

The IEEE 1394 multimedia bus standard is to be the "convergence bus" bringing together the worlds of the PC and digital consumer electronics. It is readily becoming the digital interface of choice for consumer digital audio/video applications, providing a simple, low-cost and seamless plug-and-play interconnect for clusters of digital A/V devices, and it is being adopted for PCs and peripherals.

The original specification for 1394, called IEEE 1394-1995, supported data transmission speeds of 100 to 400 Mbytes/second. Most consumer electronic devices available on the market have supported either 100 or 100/200 Mbytes/second; meaning that plenty of headroom remains in the 1394 specification. However, as more devices are added to a system, and improvements in the quality of the A/V data (i.e., more pixels and more bytes per pixel) emerge, a need for greater bandwidth has been indicated.

The 1394a specification (pending approval) offers efficiency improvements, including support for very low power, arbitration, acceleration, fast reset and suspend/resume features. The AV/C Digital Interface Command Set General Specification defines a command set for consumer and professional audio/video equipment over the IEEE Std. 1394-1995. Within the standard, audio/video devices are implemented as a common unit architecture within IEEE Std. 1394-1995.

Furthermore, the AV/C Digital Interface Command Set General Specification defines a set of data structures called AV/C descriptors, used to provide useful information about an AV/C device and its media content. In providing useful information about an AV/C device, AV/C descriptors are similar to 1212 CSR Configuration ROMs.

Referring now to FIG. 1, a flowchart of an interpretation of the AV/C General Specification descriptor hierarchy is depicted. The following excerpt from the AV/C Digital Interface Command Set General Specification, Rev. 3.0 (the General Specification) summarizes this architecture.

The AV/C descriptor mechanism supports the creation of various data structures, both static and dynamic, which contain useful information about AV/C units, subunits, and their associated components such as plugs. Additionally, these structures can be used to model the media contents provided by these subunits.

The structures can be combined to form a content navigation and selection mechanism, which allows controllers to discover and access all media contents in a general way, limiting the media-, and subunit-type specific knowledge required to perform such tasks.

These structures are applicable to any type of unit and subunit definitions of the AV/C protocol.

A descriptor is an address space on a target that contains attributes or other descriptive information. One example is the subunit identifier descriptor, which is a data block containing various pieces of information regarding a particular type of subunit. The format and contents of the subunit identifier descriptor are unique to each type of subunit. For example, all tuner subunits will have the same kind of subunit identifier descriptor. Most of the information in this structure is static in nature. However, depending on the type of subunit and the particular technologies that it implements, it is possible that some of the information may change from time to time.

Other standard descriptor structures include an object list and the object entries that it contains. An object is a generic concept that applies to a particular type of subunit, which can be defined as needed. For example, a tuner subunit implements an object list, which contains information about the various services which are available on the system. Each service is represented by an object.

Other examples of where objects may be useful might be for disc players, where the objects represent tracks on the media. For digital still cameras, objects could be the pictures that have been taken.

An object list is a generic container concept; each entry in the list is an object descriptor structure. These may also be referred to as object entries, or simply, objects.

Objects and object lists can be used to model data relationships where one entity is composed of several sub-entities. For example, an audio compact disc (CD) can be composed of the collection of audio tracks on that disc.

In the above example, an object would be used to describe the CD. That object would, in turn, have a reference to a list of objects, where each one represents an audio track. Further extending the example, a collection of several CD's can be represented by a list, where each object entry describes one of those CD's.

The hierarchical model of lists and objects can be continued to any arbitrary level of complexity.

We define the root or beginning of a hierarchy to be a list, which may contain one or more objects. This list will be accessible by its list_ID value, which can be found in the subunit identifier descriptor. A subunit identifier descriptor may refer to several root lists.

When traversing away from the root, we say that we are moving down in the hierarchy. Conversely, when moving toward the root, we are moving up in the hierarchy. There is only one root for the hierarchy, and there may be any number of leaf nodes (end points).

When an object entry has object lists associated with it, we say that the object entry is a parent. The object list that it refers to is a child.

So, object lists, which are referred to by the subunit identifier descriptor, are root lists; all other lists, which must be referred to by objects within other lists, are child lists. Object lists and object entries are defined per subunit type (tuner, etc.). There may or may not be crossover usage in other subunit types, depending on the definitions.

The unit and subunit identifier descriptors mentioned in this document are examples of descriptor structures; objects and object lists are also descriptors. When a controller wants to access a descriptor, it will use the descriptor commands to specify which descriptor it wants to deal with.

One very important fact to understand is that the structures of the various descriptors defined here are for interfacing purposes, where two separate AV/C entities (a target and a controller) must exchange information. The internal storage strategy used by a particular entity is completely transparent to these interface definitions. Data can be stored in any manner or location as required by the entity. Only when it comes time to present it to a controller will it be necessary to use these structure formats.

Thus, as may be gleaned from the above excerpt from the General Specification, in providing useful information about the media content of an AV/C device, AV/C descriptors are more similar to a networked file system. For example, AV/C descriptors are used to incidate the title of a MiniDisc in an AV/C MiniDisc player. Since MiniDiscs are writable, the disc title may be changed on the media, and AV/C descriptors are used to do so. In this case, then, AV/C descriptors may be both read and written. Thus, access to AV/C descriptors must be controlled as in a file system to prevent multiple controllers from simultaneously attempting to write to the same descriptor. Therefore, the AV/C descriptor architecture, generally, provides methods for opening access to descriptors, much like file systems do.

AV/C descriptors also provide status information such as the current amount of play time into a MiniDisc. This information is highly dynamic, changing as much as 10 times a second. Unlike other types of descriptors, status descriptors are not preconstructed in system memory and directly read when an AV/C controller reads the descriptor. Instead, the status descriptor information is read only when a descriptor read request is received. Typically, obtaining the status information involves calling a procedure which communicates with the disc mechanism controller.

The various types of descriptor information may be intermixed within the same descriptor structure. Thus, certain parts may be read only and others read/write, and some parts may be fairly static and directly accessed from memory while other parts are highly dynamic and must be obtained by calling a procedure.

Like the 1212 Configuration ROMs and file systems, AV/C descriptors are arranged in a hierarchical format. Each descriptor may have child descriptors. In a file system, each node in the hierarchy is accessed as a unit independent of its children. For example, opening access to a directory does not affect access to files within the directory. In addition, opening access to a directory allows reading of the contents of the directory but does not allow reading of the contents of the files within the directory. AV/C descriptors, however, do not provide the same treatment with regards to descriptor access. Opening access to an AV/C descriptor may also open access to many if not all of its children. In addition, opening access to an AV/C descriptor allows reading of both the descriptor and often its children. Thus, access to a descriptor may be opened by opening the descriptor itself, its parent, its parent's parent, and so forth.

Because of the AV/C descriptor access methods, an AV/C descriptor may be accessed as a whole unit or as a part of a parent descriptor. When an AV/C controller reads a descriptor, it specifies the starting address within the descriptor to begin reading. This descriptor "address space" depends upon how a descriptor is accessed. If a descriptor is accessed as a whole unit, the first field in the descriptor is located at address 0. However, if the descriptor is accessed as a part of its parent, the first field is not address 0, but another address. Thus, the fields within a descriptor are located at different addresses depending upon the type of descriptor access; descriptors, therefore, may have multiple address spaces.

Attempting to implement an AV/C descriptor as a whole is thus very difficult. Doing so may involve several types of data formats, storage and retreival methods, access methods, and address spaces. The general specification implies attempting to implement each AV/C descriptor as a whole, leading to an implementation that is difficult to manage and different for each type of descriptor and device. The General Specification, however, leaves open the actual implementation methodologies and stragegies to developers as long as the methodology or strategy stays within the perameters of the specification. That is, as long as when it comes time to present data to a controller, the prescribed structure is utilized. How this is implemented is not prescribed.

BRIEF DESCRIPTION OF THE INVENTION

This invention breaks down the AV/C descriptor strucutres into smaller components called containers. Using containers, the AV/C descriptor is decomposed into smaller, more manageable parts. Internally, each part contains descriptor information with the same data format, storage method, access method, and a single address space. However, each part may contain descriptor information with a data format, storage method, and access method that is different from the other parts. By combining multiple, simple containers, a more complex descriptor may be formed and thus, both comply with the AV/C General Specification and enable communicaiton with legacy devices.

This system defines a structure referred to herein as an AV/C container. Each container may have an associated set of data and access methods. Container data may directly represent some data fields within an AV/C descriptor, may be an alternate representation of the AV/C descriptor data fields, or may contain information describing how to produce AV/C descriptor data fields (e.g., a register location where the current disc play time may be read).

The container access methods include procedures for reading and writing the container data in the AV/C descriptor format, opening access to the container, adding child containers, and notifying parent containers of changes to child containers. This system assigns to each container a single address space specific to that container. The first data field of each container begins at address zero (0). This system provides a method for remapping AV/C descriptor address spaces into AV/C container address spaces and back again. Rather than managing multiple address spaces for each descriptor, this system provides a method whereby only a single address space is managed for each container and a means for mapping from the various descriptor address spaces to the container address space.

To handle an AV/C descriptor read request, a read data buffer is created and the appropriate descriptor data fields are added sequentially into the read buffer. The set of descriptor data fields may come from multiple containers. When an AV/C descriptor read request is handled, the top level container for the specified descriptor is identified. The address space for the AV/C descriptor of the General Specification and the top level container of this system are the same (they both start at 00 00). The read buffer offset is initialized to zero (0), the current read address and length are initialized to the values specified in the read request, and the current container is initialized to the top level container. The descriptor read process then begins by reading the current container data which is the top level container.

The process to read the container checks whether the length of the container data is greater than the current address. If it is, the process computes the number of bytes to read from the container data. This will be the minimum of the container data length less the current address, or the current read request length. This amount of data is read from the container starting at the current address. This data is then copied into the read buffer at the current read buffer offset. Then, the read buffer offset and current address are incremented by the number of bytes read from the container, and the current read request length is decremented by the number of bytes read from the container. If the length of the container data is not greater than the current address, no data is read from the container.

Next, the current address is adjusted so that its value is appropriate for the address space of the next container to be read. This is accomplished by decrementing the current address by the length of the current container data. Thereafter, the process checks whether the current container has any children. If it does, the read container process is applied to each such available child container. Otherwise, the process continues with the parent container. If the parent has more children to read from, the read process continues with the parent's next child. Otherwise, the process continues with the parent's parent and back up to the top-level parent container. The process, therefore, ocntinues as needed, until all of the top-level container's children have been read. Put another way, the process continues until the requested amount of data is read or there are no more a containers to read from.

Therefore it is a primary object of the present invention to provide a method for implementing an AV/C container architecture.

It is another object of the present invention to provide a method for recompiling AV/C desriptor data into a format which complies with the AV/C General Specificaiton.

It is yet another object of the present invention to provide a memory manipulation system which allows for specified registry point manipulation, compilation, and recompilation.

These and other objects of the present invention will be made manifest when considering the following detailed specification when taken in conjunction with the appended drawing figures.

BRIEF DESCRIPTION OF THE DRAWING FIGURES

FIG. 6A is a first exemplary flowchart of an application of a method of the present invention.

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figures 1, 2:
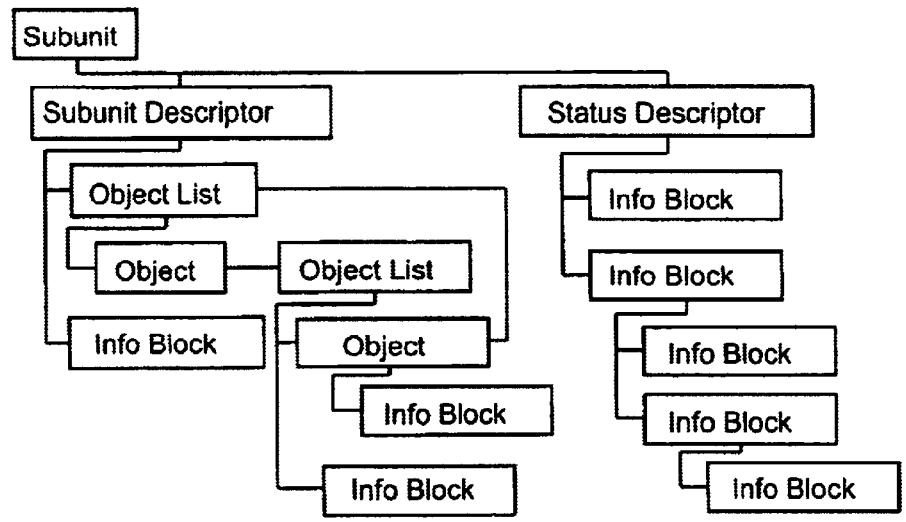
FIG. 1 is a flowchart of an illustrative prior art AV/C General Specification Subunit/Descriptor hierarchy.
FIG. 2 is a schematic diagram of the general object list descriptor as specified in the AV/C general specification.

Referring now to FIG. 2, a general object list descriptor 10 as prescribed by the General Specification is depicted. It is the goal of the specification that all implementations or methodologies which manipulate data for such AV/C devices conform the data to this form for acquisition by other devices. Therefore, a methodology will be described hereinbelow which provides enhanced acquisition of data from such general object list descriptors for devices enabled therewith and which may thereafter recompile any manipulated data back into such a prescribed format. As can be seen in FIG. 2, a plurality of fields or registers 12 are indicated along with specified numeric addresses 14. Each of the fields 12, such as descriptor_length 16, list_type 18, attributes 20, size_of_list_specific_information 22, list_specific_information 24, number_of_entries(n) 26, and the corresponding entries, object_entry[0] to object_entry[n−1], serves a separate and distinct purpose. Furthermore, the data contained in such entries may be static or dynamic, and may also be readable and/or writable by another device. As may be gleaned from FIG. 2, for a device to read information from a lower level object entry, it may become quite cumbersome to do so by referring to the beginning address [00 00] and working downward to the entry as may be initially attempted, but for the following disclosure.

Generally speaking, the descriptor_length field contains the number of bytes which follow in this object list structure. The list_type field indicates what kind of list this is. The attributes field contains bit flags which indicate attributes that pertain to the entire list structure. The size_of list specific_information field specifies the number of bytes used for the following list specific information field. The list_specific_information field contains information that is specific to a particular list_type. The number_of_entries field contains the number of entries in this list. The object_entry fields are object entries.

Figure 3:
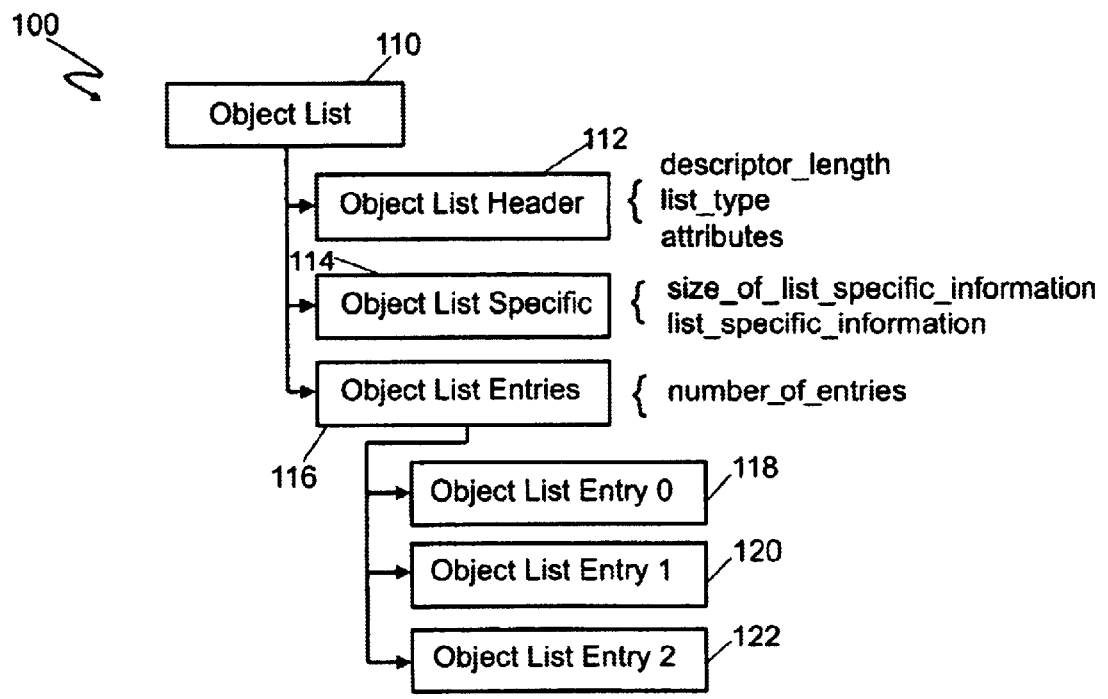
FIG. 3 is a hierarchical flowchart of the decomposition of the AV/C general specification general object list descriptor into containers as indicated by the present invention.

Referring now to FIG. 3, a preferred embodiment of an object list 100 is indicated. The general object list descriptor has been deconstructed into a plurality of containers 110–122. The object list container 1 10 includes, in this example, an object list header container 112, an object list specific container 114, and an object list entries container 116. Furthermore, the object list entries container 116 includes three object list entry containers 118, 120, 122. The object list header container 112 includes three of the fields that were previously represented in the general object list descriptor, including, descriptor_length, list_type, and attributes. Therefore, should a device wish to determine this higher level type information, it need only access this container 112 to so be imparted with such information without the necessity of accessing any other containers.

Likewise, the object list specific container 114 includes the $size_{13}$ $of_{13}$ $list_{13}$ specific_information field and the $list_{13}$ specific_information field and the object list entries container 116 includes the number_of_entries field. By being able to individually access the object list entries field 116, one can determine immediately the number of objects included therebelow. In this exemplary FIG. 3, the number_of_entries is 3, and hence, object list entry container 0 118, object list entry container 1 120, and object list entry container 2 122, lie thereunder. As indicated above, each object list entry container includes a plurality of similar descriptor fields for the particular object in question.

By, thus deconstructing the general object list descriptor into several individual containers, the data held in those containers may more readily be obtained and manipulated. That is, instead of having to drill down through the FIG. 2 hierarchy to get to specified object_entry data, a device may now direct its attention to the requisite container and obtain the information necessary. It should be noted that such object list descriptor information is maintained preferably in a memory space such as a ROM or EEPROM, but other similar memory means may be utilized without departing from the spirit of this disclosure. Further, the memory space is preferably in operative communication with a processing means, such as a microprocessor.

Having now thus described the container hierarchy to be utilized in this system, it is clear that accessing data via these containers will be far more useful, especially where the data is changing dynamically and rapidly. That is, suppose object list entry container 2 122 includes data regarding a CD track that is playing. If one had to access the FIG. 2 object list descriptor as a whole while reading data from object list entry 2, then while so reading, the list is held open and may preclude other devices from opening other objects at this same time. That is simply unacceptable for many high throughput, fast access, multi-tasking applications. In the FIG. 3 hierarchy, one can now see that container 122 may be accessed while, advantageously, not disturbing any other containers.

Figure 4:
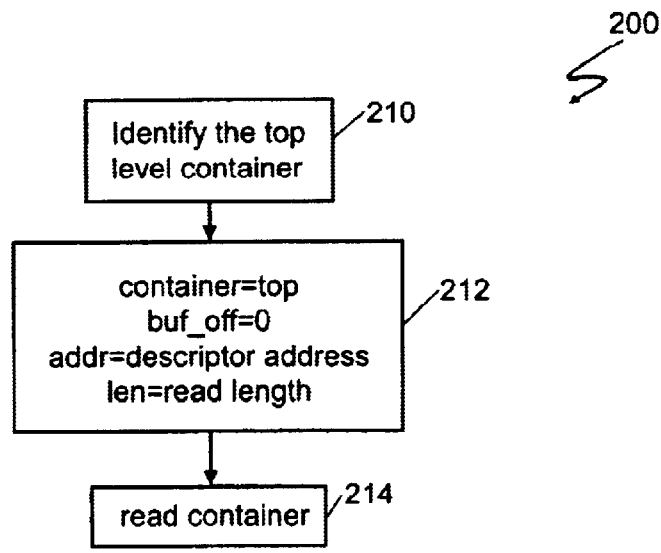
FIG. 4 is a flowchart of a method of the present invention for handling a read descriptor command.

A device now enabled with such a container system will also need to be accessed by other devices utilizing the general object list descriptor architecture of FIGS. 1 and 2. Hereafter will be described a method for so providing such information requested by such a device in the format desired, namely, the prescribed general object list descriptor format. Referring now to FIG. 4, and upon receipt of a prescribed read descriptor command, the target device enabled by this container system will first identify the top level container of the system as indicated by box 210 of the general read descriptor flowchart 200. Once the top level container is identified, certain initial settings will be established in accordance with the read descriptor command received from the controller device as indicated in box 212. That is, a read buffer will be established and the initial read buffer offset address will be set to zero. In this manner, the appropriate descriptor information sought by the controller may be built in this newly established buffer. The target will also acquire the descriptor address being sought by the controller from the read descriptor request sent by the controller along with the string length of the data sought, sent by the controller as a read length. That is, the request sent by the controller, conforming to the general standard, will include the starting descriptor address sought and the length of the data string to be read. Put another way, and referring now to FIG. 2, a controller may wish to read the descriptor indicated therein starting at address 00 00 for a length of 4 bytes. That would mean that the controller wished data within fields 00 00 to 00 03. This container system must thus provide that requested data to the controller.

Figure 5:
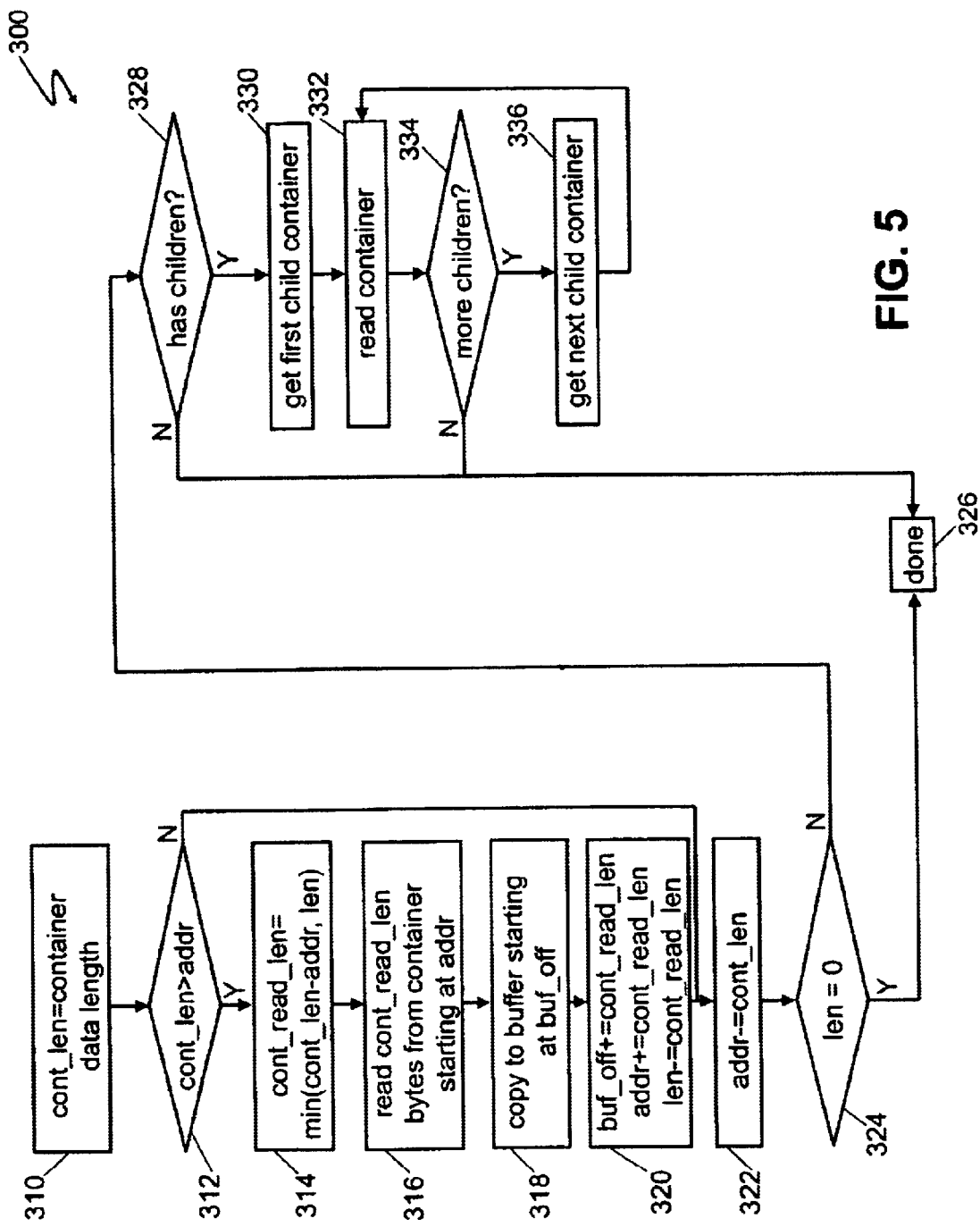
FIG. 5 is a flowchart of a method of the present invention for reading a container.

Once these parameters are established, the data may be read from the appropriate container or containers as in box 214 and compiled in the previously mentioned read buffer form for transmission to the requesting controller. Referring now to FIG. 5, a method 300 for reading the appropriate container data is depicted. This method includes starting at the top container and first setting the container length (cont_len) to the length of the container data fields as is known for the each container as in block 310. That is, if the length of the first parent container is 20 bytes, then cont_len is set initially to 20. Next, that cont_len is compared to the value of the descriptor address (which is now addr, see FIG. 4) as in block 312. If the container length is greater than the address, then data needs to be read from this first container. If the cont_len is less than or equal to addr, then the starting address is not within this container but starts, perhaps in the next container, which will be checked in a similar fashion (described below).

Assuming that cont_len is greater than addr, something is in the first container to read. Thus, the next activity is to set a new variable, cont_read_len equal to the minimum of cont_len less addr, or len as in block 314. That is, at this point we now know that the starting address is within this container and we must now read either all the necessary data, if it all lies within this container (len), or all the data in this container starting from the initial requested address to the end of the container (any remaining data that needs to be read will be described below). Then, a number of bytes equal to cont_read_len (either all data desired or data to end of the container) will be read starting at the desired address as in block 316. This data will then be copied into a read buffer (and will be augmented, if necessary, with more data from child containers) as in block 318. Referring now to block 320, the buffer offset must now be incremented in an amount equal to cont_read_len (the amount of data read into the read buffer). The starting address, addr, must also be incremented by the amount of cont_read_len (this is where the next reading will start). The length of the string to be read will now also be decreased by cont_read_len (since that much has just been read, and only the decremented amount remains).

Then, since the process is preparing to inquire into the child containers of the container that was just read from, and the parent container is limited in length (20 bytes in the above mentioned example), addr must be decremented by cont_len (the container length) as in block 322. This also applies, when the container length is not greater than the initial addr. That is, if at block 312, cont_len was less than addr, it was understood that the address requested was not in the container being checked. Therefore, in either case the next question is whether the next child container must be checked. If all requested data has been gathered, the answer is no. If all requested data has not been gathered, then the answer is yes. Put another way, if len is equal to zero, all of the requested data has been read into the read buffer as in block 324. Otherwise, the process must continue with any remaining children until all of the requested and available data has been read into the read buffer.

As alluded to above, the next question is, if the process has not already read all requested data, are there any children to read from as in block 328? If there are no more children, but the requester sought more data, only the available data will be provided as already read into the read buffer and we are again at block 326 and done. If, on the other hand, more child containers exist, each will be read in turn in a like manner until all requested data is read or no more containers are available as in blocks 330–336.

Figure 6B:
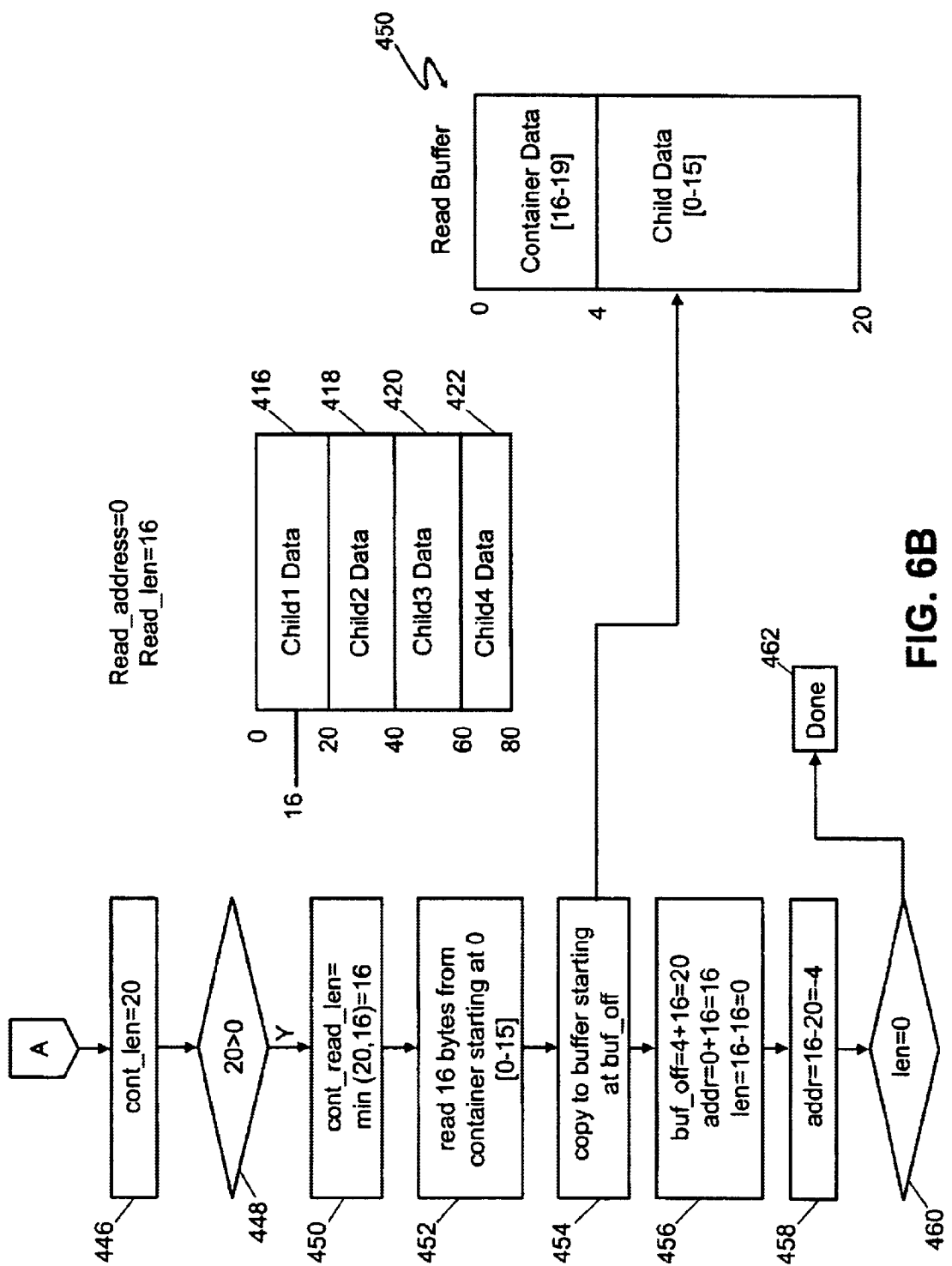
FIG. 6B is a continuation of the exemplary flowchart of FIG. 6A.

To better illustrate this process, a first example is provided in FIGS. 6A and 6B. Referring now to FIG. 6A, it will be assumed that a controller has sent a read descriptor request for a starting address of 16 and for a length of 20 bytes. Although the requestor understands the general specification, the requestor does not understand this container process, but has sent a request assuming the target would understand the prescribed general object list descriptor. Therefore, the target must gather the data requested as though it maintained that data in accordance with the specified general object list descriptor. In this example, the containers 412 include a parent container 414 which includes four child containers 416, 418, 420, and 422. Each container is 20 bytes in length. Thus, the parent container 414 includes addresses 0 to 19, the first child container 416 includes addresses 20 to 39, the second child container 418 includes addresses 40 to 59, the third child container 420 includes addresses 60 to 79, and the forth child container 422 includes addresses 80 to 99.

Therefore, starting at the top container, the read buffer offset is initially set to zero, addr is set to be equal to the descriptor address (16 in this example), and len is set to the length to be read (20 in this example), and the container read process may commence. As indicated, the first container length is 20 bytes, thus cont_len is set at 20 as in block 424. The container length, cont_len 20, is compared to addr, the descriptor read address at this point, which is 16 as in block 426. Since 20 is greater than 16, or put another way, the start address is within the parent container, data must be read from this container and the process proceeds to the next activity.

Now it must be determined how much data to read from this container as in block 428. There are two possibilities: all the requested data can be read from this container, or all the data from this starting address to the end of the container must be read. In this example, the latter situation is implicated. Thus, cont_read_len is equal to the lesser of the cont_len (20) less addr (16) which equals 4, or len which equals 20. The lesser is then 4. This means that there are 4 bytes to be read from this container 414 starting at address 16 and ending at address 19 as in block 430. That data is then copied into the read buffer 450 as in block 432. Referring now to block 434, the buffer offset must now be adjusted by 4 due to this new data, as well as addr being incremented by 4 since 4 bytes have been taken care of now, and the length, len, must be deceased by 4 since 4 bytes have been read into the buffer. Since we are also at the end of the container, the new starting address should not be 20, but zero, as each container stands alone and independent of the others as in block 436. That is, although the general object list descriptor model may include consecutive addressing, the container system, as explained above, includes independently accessible containers. Thus, once the end of one container is reached, the process must prepare itself for the start of the next container, which will be zero. Next, if the length had been just 4 bytes the process would be done; since 4 bytes are in the buffer. However, in this example, the requested read length was 20, so 16 more bytes, if available must be read. Furthermore, since this first container has children, the process moves on to the first child to read that container as in blocks 438, 440, 442, and 444.

Referring now to FIG. 6B, the process goes back to the beginning with the newly calculated values indicated above (starting address=0 and length yet to be read=16). Again, this first child container is 20 bytes in length [0–19] as in block 446. Since the container length (20) is greater than the starting address (0) (there is data to read in this container) as in block 448, it must be decided whether to read all the data in this container or some lesser necessary amount as in block 450. In this example, since only 16 bytes are left in the request, only 16 bytes need be read from this container and not the entire 20. Therefore, data from addresses 0–15 are read (block 452) and copied (block 454) into the read buffer 450 sequentially following the previously read parent container data. Thus, a 20 byte read buffer has been constructed with the data requested by the requester and in a form understood by the requester (a sequential data list). This read buffer is now ready to be read by the requester. The remainder of the blocks 456–460 lead to the ultimate "done" block 462.

Figure 7A:
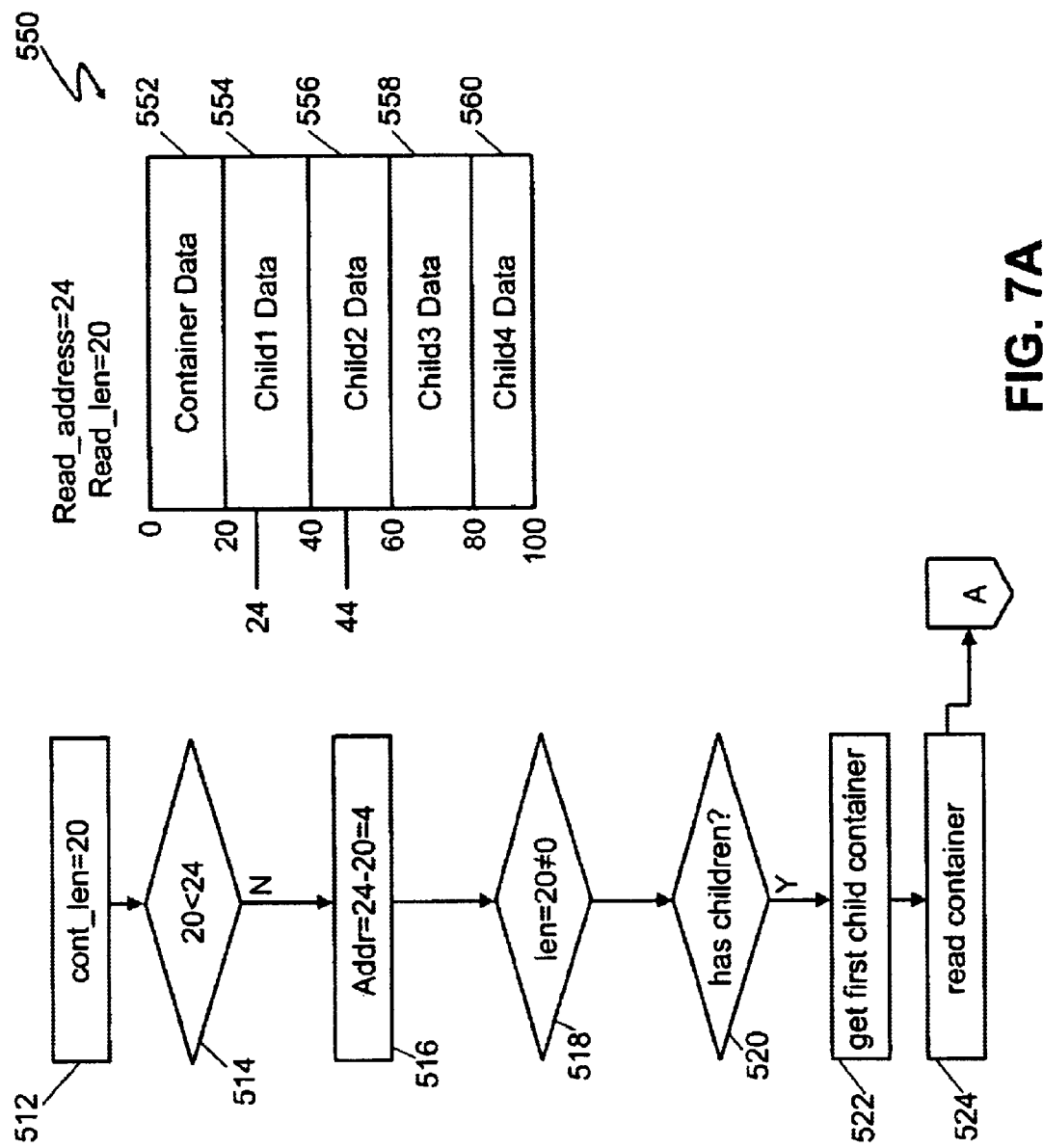
FIG. 7A is a second exemplary flowchart of an application of a method of the present invention.
Figure 7B:
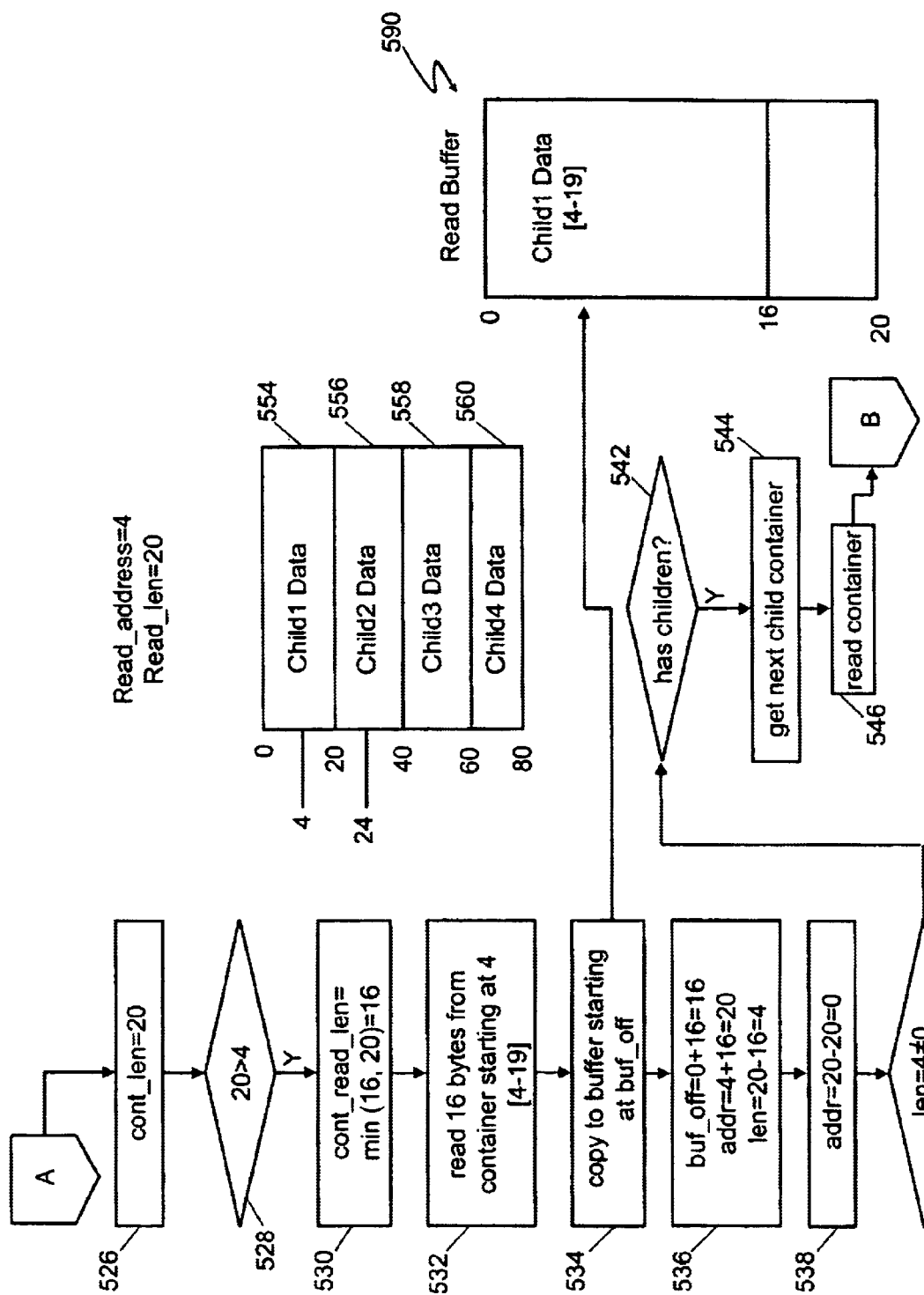
FIG. 7B is a continuation of the second exemplary flowchart of FIG. 7A.
Figure 7C:
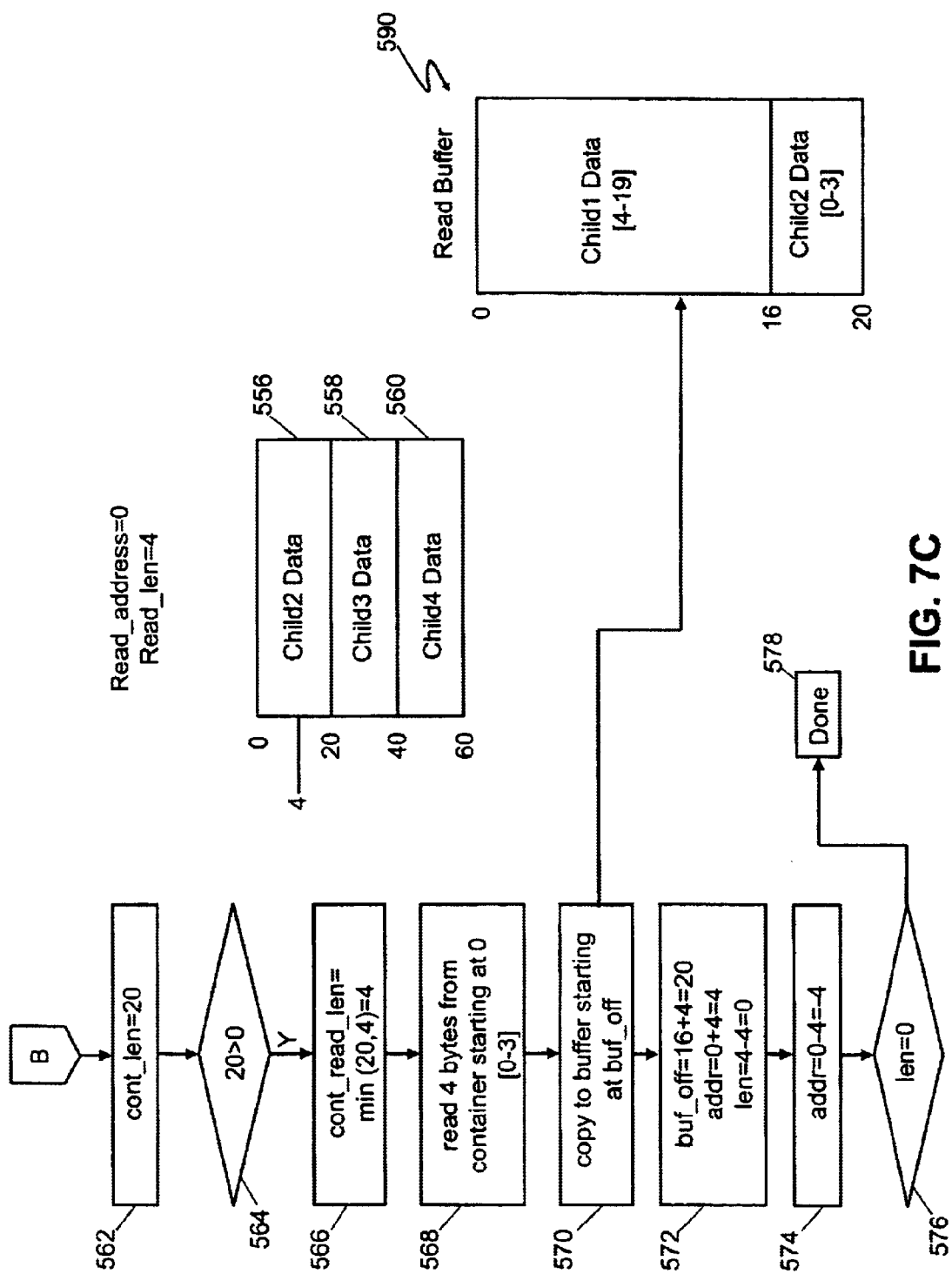
FIG. 7C is a continuation of the exemplary flowchart of FIG. 7B.

Turning now to FIGS. 7A, 7B, and 7C, a second example of this process will be illustrated. In this example, a requestor device is seeking a 20 byte string starting at address 24. Again, the containers are all 20 bytes in length. Therefore, as can be seen in FIG. 7A, the requested data is in the first and second child containers 554 and 556 of 550. The process, however, starts at the top container 552, as it has not yet determined this fact. The buffer offset is again set to zero, addr is set to the start address (24), and len is set to the read length (20). An attempt is then made to read the parent container 552. However, in this example, the starting address is greater than this first container length (from block 512), and thus outside the parent container as in block 514. The process then decrements addr by the container length, thus making the starting address shift according to the container size as in block 516. In this instance, since the original starting address was 24 and the parent container was 20 bytes long, the new starting address sought will be 4. Further, since no data has yet been read, the length sought is still 20 as in block 518. So then the question is, are there any children to read from as in block 520? As there are children in this example, the process gets the first child container and starts over as in blocks 522 and 524.

Referring now, then, to FIG. 7B, a similar attempt to read the first child container will be made. Here, as the new address (addr) is 4, which is less than the container length (from block 526), there is data to be read from this container (as in block 528). How much, is the next question. Can all 20 bytes sought be read from this container or may only a string to the end of the container be read as in block 530? In this example, the 16 bytes of data from address 4 to the end of the container may only be read [4–19]. Thus, those bytes are read (block 532) and copied into the buffer 590 at offset zero (block 534). Referring now to block 536, since 16 bytes were read into the buffer, the buffer offset is incremented by 16. Likewise, the starting address is incremented by 16 from 4 to 20. But the length of data yet to be read is decreased by 16 to 4. Furthermore, the address is also decreased by the container length making the new starting address for the next container (assuming one exists) now zero as in block 538. As more data has been requested (len=4≠0) as in block 540 and there is another child container 542, the process starts again with that next child container.

Referring now to FIG. 7C, then, the child2 container 556 is 20 bytes in length as in block 562 which is greater than the start address (0), so the data available must be read as in block 564. How much? The lesser of the amount available in the child2 container 556 (20 bytes) and the amount left in the request (4 bytes) as in block 566. Thus, 4 bytes is read from the child2 container 556 starting at 0 [0–3] as in block 568 and copied to the read buffer 590 starting at the buffer offset (16) as in block 570. As this fulfills the request (len=0), the process is completed and the read buffer may now be read by the requesting device as in blocks 572, 574, 576, and 578.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method of managing AV/C object list descriptor data stored in memory, the descriptor data comprising an externally visible address space, the method comprising:

compiling a plurality of containers in said memory from said AV/C object list descriptor data wherein each of said plurality of containers includes a portion of said AV/C descriptor data;

registering one or more fields within each said each of said plurality of containers; and arranging said plurality of containers into a logical hierarchy.

2. The method of claim 1, further comprising:

associating addresses in said memory with each of said one or more fields sequentially enumerated within each container in said plurality of containers.

3. The method of claim 2, further comprising mapping said fields to a prescribed field list.

4. The method of claim 3, further comprising:

accessing any field within any of said plurality of containers independently from any other ones of said plurality of containers; and reading data from any field within any of said plurality of containers without affecting access to any other of said plurality of containers.

5. In a memory space, an AV/C object list descriptor management system, comprising:

a plurality of descriptor data containers wherein each of said plurality of data containers stores a portion of AV/C object list descriptor data, the descriptor data comprising an externally visible address space;

one or more data fields within each of said plurality of containers; and wherein said plurality of containers is arranged in a hierarchical format.

6. The AV/C object list descriptor management system of claim 5, further comprising unique address registers of said memory space associated with each of said one or more data fields in each of said plurality of containers.

7. The AV/C object list descriptor management system of claim 6, further comprising means for building a read buffer in response to a read descriptor request, said read buffer presented in a standardized list format.

8. The AV/C descriptor object list management system of claim 7 wherein said means for building a read buffer includes means for mapping said unique address registers to said standardized list format fields.

9. The AV/C object list descriptor management system of claim 8 further comprising a plurality of child containers, said plurality of child containers including at least an object list header container, and an object list entries container reflecting the number of object list entries include therebeneath, said object list entries container including at least one child container in the form of an object list entry.

10. A method for compiling an AV/C object list descriptor readable buffer from one or more data containers, each of said one or more data containers storing a portion of AV/C descriptor data in a memory, the descriptor data comprising an externally visible address space, said method comprising:

identifying a top level data container from said one or more containers;

initializing compilation attributes for reading data from said one or more data containers into a readable buffer;

sequentially reading data from said one or more data containers; and copying said read data into said readable buffer.

11. The method of claim 10 wherein step of said initializing said compilation attributes comprises:

establishing said readable buffer in a memory space and setting a readable buffer offset to zero.

12. The method of claim 11 wherein the step of sequentially reading said data includes recursively searching for responsive data, said recursive search initialized with said initialized compilation attributes.

13. A method for reading AV/C descriptor container data from one or more data containers each storing a portion of AV/C descriptor data stored in memory into a readable buffer upon receipt of an address request and request length from a requester, the descriptor data comprising an externally visible address space, the method comprising:

ascertaining which container, of the one or more containers, holds the initial address of the request;

reading all data available and responsive to the request within the ascertained container; and copying the read data to a read buffer.

14. The method of claim 13, further comprising recursively reading data from any other sequentially addressed containers, one at a time, until the request is satisfied within the constraints of available containers.

* * * * *